(12) United States Patent
Willis

(10) Patent No.: US 9,654,176 B2
(45) Date of Patent: May 16, 2017

(54) MEASUREMENT, CONTROL AND HARVEST OPTIMIZATION DEVICE FOR SOLAR MODULES REQUIRING FEWER CONNECTIONS

(71) Applicant: HIQ SOLAR, INC., Santa Clara, CA (US)

(72) Inventor: Andre P. Willis, Palo Alto, CA (US)

(73) Assignee: HiQ Solar, Inc., Santa Clara, CA (US)

(*) Notice: Subject to any disclaimer, the term of this patent is extended or adjusted under 35 U.S.C. 154(b) by 544 days.

(21) Appl. No.: 14/206,336

(22) Filed: Mar. 12, 2014

(65) Prior Publication Data

US 2014/0265551 A1 Sep. 18, 2014

Related U.S. Application Data

(60) Provisional application No. 61/781,568, filed on Mar. 14, 2013.

(51) Int. Cl.
 H04B 3/54 (2006.01)
 H02J 13/00 (2006.01)
 H02J 3/38 (2006.01)

(52) U.S. Cl.
 CPC ........... *H04B 3/548* (2013.01); *H02J 3/383* (2013.01); *H02J 13/0003* (2013.01); *H04B 2203/5445* (2013.01); *H04B 2203/5487* (2013.01); *Y02E 40/72* (2013.01); *Y10T 307/685* (2015.04)

(58) Field of Classification Search
 CPC H04B 3/548; H04B 2203/5445; H04B 3/542; H04B 3/56; Y10T 307/685; H02J 3/383; H02J 13/0003; H02J 3/385; Y02E 10/58; Y02E 40/72

See application file for complete search history.

(56) References Cited

U.S. PATENT DOCUMENTS 8,107,516 B2 * 1/2012 Fornage ............... H04B 3/54
                                              340/12.32
8,624,436 B2   1/2014 Willis
                (Continued)

FOREIGN PATENT DOCUMENTS

CN    101404521 A    4/2009
CN    101453247 A    6/2009
         (Continued)

OTHER PUBLICATIONS

International Search Report and Written Opinion in PCT/US2014/026131 issued on Jul. 17, 2014, 9 pages.
(Continued)

*Primary Examiner* — Ryan Johnson
(74) *Attorney, Agent, or Firm* — Fountainhead Law Group P.C.

(57) ABSTRACT

System and method for enabling communications via a power line conveying DC power from multiple DC power sources such as solar panels. Power and communications are provided using a single combined power and communications line. Data communication signals received over the power line are detected and compared against power line voltage for processing received data and generating data for transmission. Remote units are self-powered using power harvesting of the data communication signals.

13 Claims, 10 Drawing Sheets

(56) References Cited

U.S. PATENT DOCUMENTS

| | | | |
|---|---|---|---|
| 8,860,242 B1* | 10/2014 | Pruett | H02J 4/00 307/5 |
| 2009/0160258 A1* | 6/2009 | Allen | H02J 1/10 307/82 |
| 2013/0009483 A1 | 1/2013 | Kawate et al. | |
| 2014/0161201 A1* | 6/2014 | Yukizane | H04B 3/548 375/257 |
| 2014/0265586 A1 | 9/2014 | Willis | |
| 2014/0266294 A1 | 9/2014 | Willis | |

FOREIGN PATENT DOCUMENTS

| | | | |
|---|---|---|---|
| CN | 102577148 A | 7/2012 | |
| EP | 2469680 | 6/2012 | |
| JP | 2005-192376 | 7/2005 | |
| JP | 4082443 B2 | 4/2008 | |
| JP | 2010-080548 | 4/2010 | |
| JP | 2011082802 A | 4/2011 | |
| JP | 2012-078090 | 4/2012 | |
| JP | WO 2013014879 A1 * | 1/2013 | H04B 3/548 |

OTHER PUBLICATIONS

Office Action dated Dec. 9, 2016 for CN Appln. No. 201480022780.8, 21 pages.

* cited by examiner

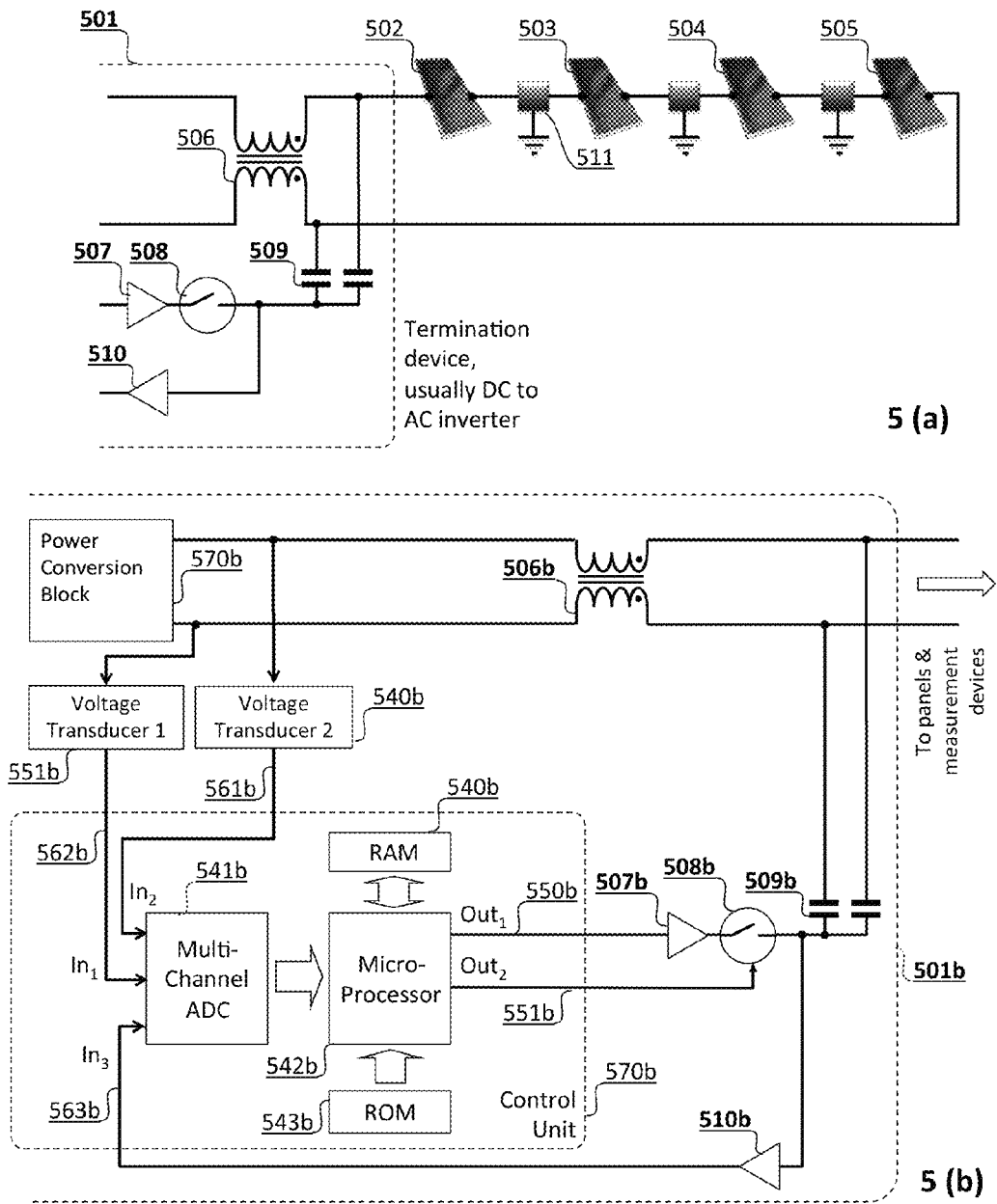
Figure 5 (a) and (b)

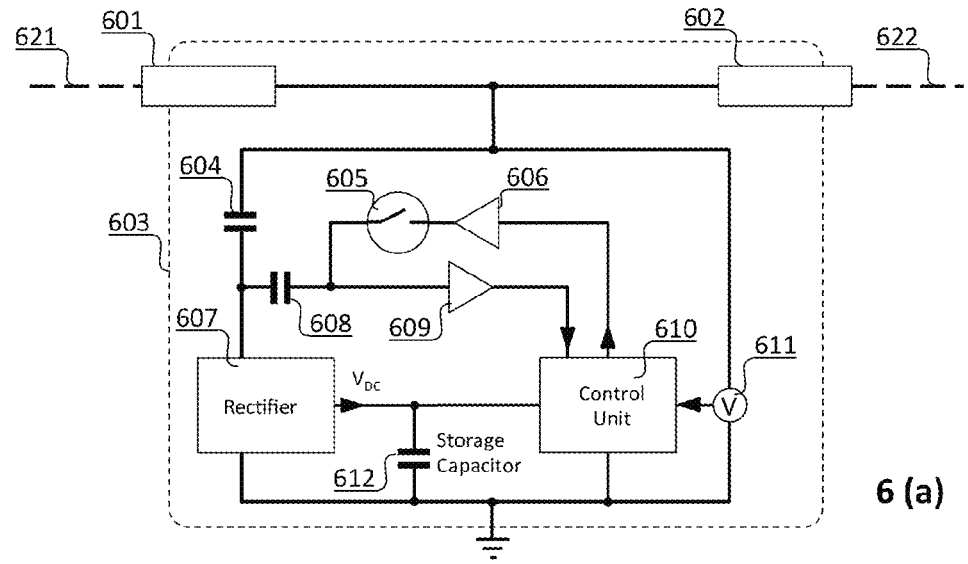
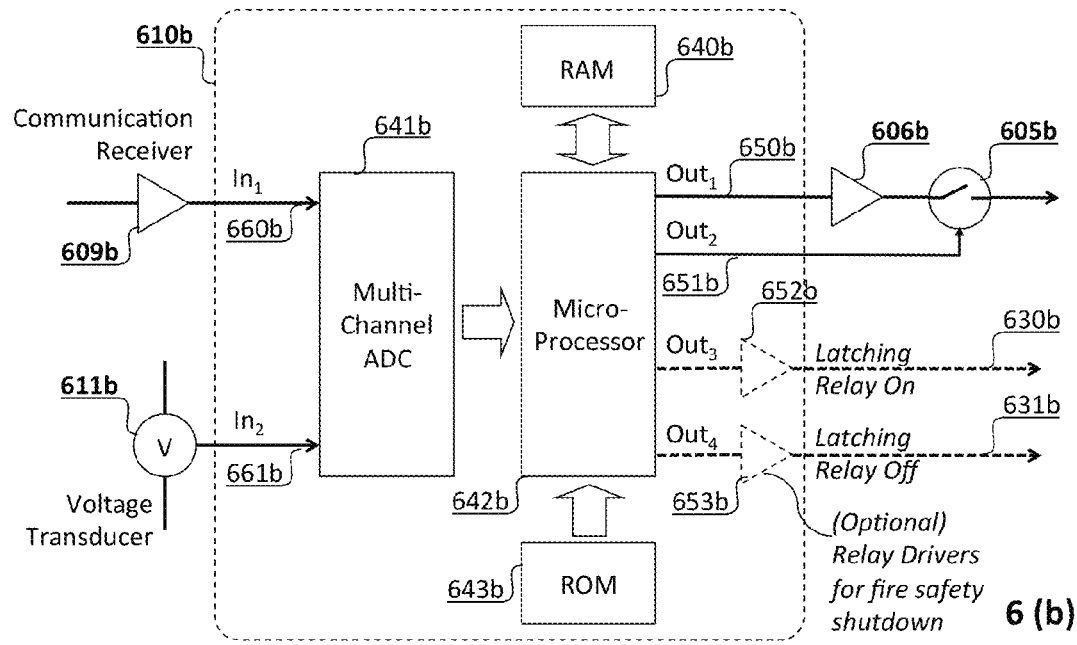
Figure 6 (a) and (b)

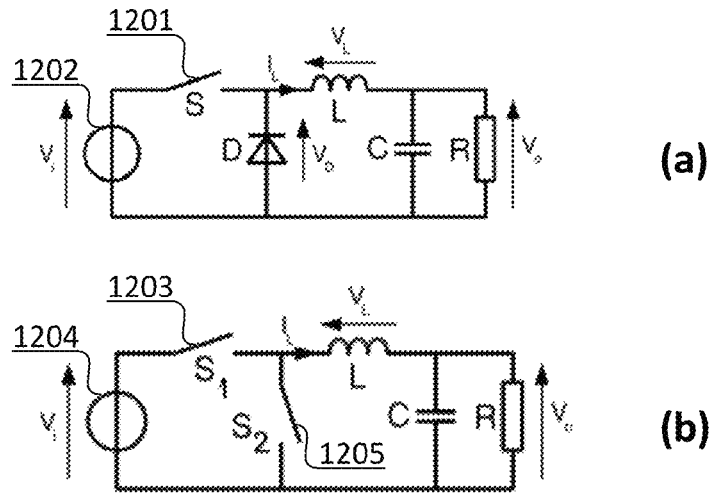
Figure 12 (a) and (b)
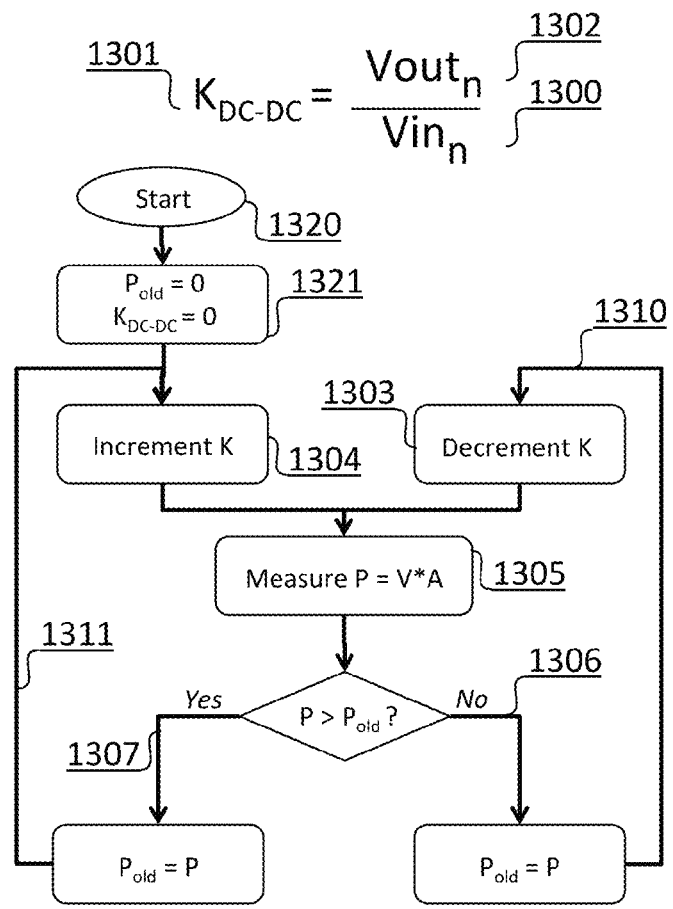
Figure 13

MEASUREMENT, CONTROL AND HARVEST OPTIMIZATION DEVICE FOR SOLAR MODULES REQUIRING FEWER CONNECTIONS

RELATED APPLICATIONS

This application claims priority to and the benefit of U.S. Patent Application 61/781,568, entitled "Measurement, Control and Harvest Optimization Device for Solar Modules Requiring Fewer Connections," which was filed on Mar. 14, 2013, the disclosure of which is incorporated herein by reference.

BACKGROUND

The present invention relates to power sources, such as solar panel arrays, and in particular, to power harvesting techniques for such power sources.

It is common for solar panels (102, 103, 104, 105) to be connected in a serial string such as shown in FIG. 1. The two ends of the string are usually connected to a termination device such as an inverter (101). This configuration is simple to install but does not allow individual panel measurement or control.

To provide measurement, and often control, two known implementations are shown in FIG. 2(a) and (b). Here individual solar panels are connected with both power wires to separate devices (206, 216), and those devices are connected back to the termination device (201, 211). These architectures require both connections to be routed to them for each panel and do not easily lend themselves to installing a device per group rather than per panel.

SUMMARY

In accordance with the presently claimed invention, systems and methods are provided for enabling communications via a power line conveying DC power from multiple DC power sources such as solar panels. Power and communications are provided using a single combined power and communications line. Data communication signals received over the power line are detected and compared against power line voltage for processing received data and generating data for transmission. Remote units are self-powered using power harvesting of the data communication signals.

In accordance with one embodiment of the presently claimed invention, a system for enabling communications via a power line conveying DC power from multiple DC power sources includes: first and second power line electrodes for connecting to first and second ends of a power line conveying DC power from a plurality of serially coupled DC power sources; receiver circuitry coupled to the first and second power line electrodes, and responsive to one or more power line voltages at the first and second power line electrodes by providing first and second signals related to the one or more power line voltages; transceiver circuitry coupled to the first and second power line electrodes and the receiver circuitry, responsive to one or more power line signals by providing a third signal related to the one or more power line signals, and responsive to a fourth signal and at least one control signal by conveying the fourth signal to the first and second power line electrodes; and control circuitry coupled to the receiver circuitry and the transceiver circuitry, and responsive to at least the first, second and third signals by providing the fourth signal and the at least one control signal.

In accordance with another embodiment of the presently claimed invention, a system for enabling communications via a power line conveying DC power from multiple DC power sources includes: a power line electrode for connecting to a power line conveying DC power from a plurality of serially coupled DC power sources and an AC signal; a reference electrode; local power circuitry coupled between the power line and reference electrodes, and responsive to at least a first portion of the AC signal by providing a local DC power; and transceiver circuitry coupled between the power line and reference electrodes and to the local power circuitry, and responsive to the local DC power and the at least a first portion of the AC signal by providing a second portion of the AC signal.

In accordance with another embodiment of the presently claimed invention, a method for enabling communications via a power line conveying DC power from multiple DC power sources includes: connecting to first and second ends of a power line conveying DC power from a plurality of serially coupled DC power sources; responding to one or more power line voltages at the first and second power line electrodes by providing first and second signals related to the one or more power line voltages; responding to one or more power line signals by providing a third signal related to the one or more power line signals; responding to a fourth signal and at least one control signal by conveying the fourth signal to the first and second power line electrodes; and responding to at least the first, second and third signals by providing the fourth signal and the at least one control signal.

In accordance with another embodiment of the presently claimed invention, a method for enabling communications via a power line conveying DC power from multiple DC power sources includes: connecting to a power line conveying DC power from a plurality of serially coupled DC power sources and an AC signal; responding to at least a first portion of the AC signal by providing a local DC power; and responding to the local DC power and the at least a first portion of the AC signal by providing a second portion of the AC signal.

BRIEF DESCRIPTION OF THE DRAWINGS

FIG. 12 depicts exemplary buck converter circuits.

FIG. 13 depicts a logic flow for an exemplary 'perturb and observe' algorithm.

DETAILED DESCRIPTION

Exemplary embodiments of the presently claimed invention enable: a device that can make measurements of voltage and current of solar panels connected in a string, provide control functions and require connection to only one panel wire and ground; and a device that can make measurements of voltage and current as well as perform other control functions such as MPPT per panel or group of panels, requiring a connection to only one panel wire and a cable that connects all such device together back to the termination device.

Measurement, Control and Harvest Optimization, Instance #1

Figure 3:
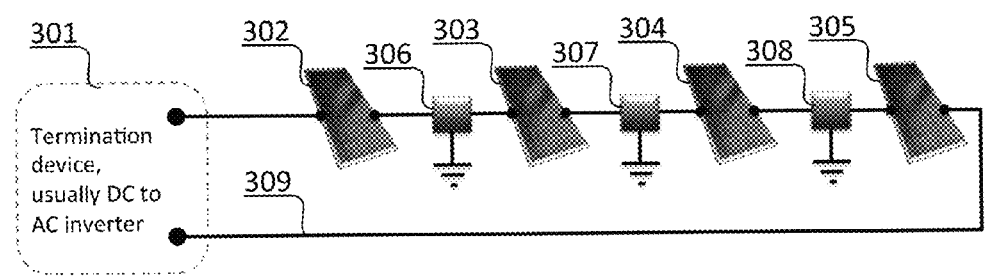
FIG. 3 depicts solar panels connected with a minimum of connections for measurement and control in accordance with exemplary embodiments of the presently claimed invention.
Figure 4:
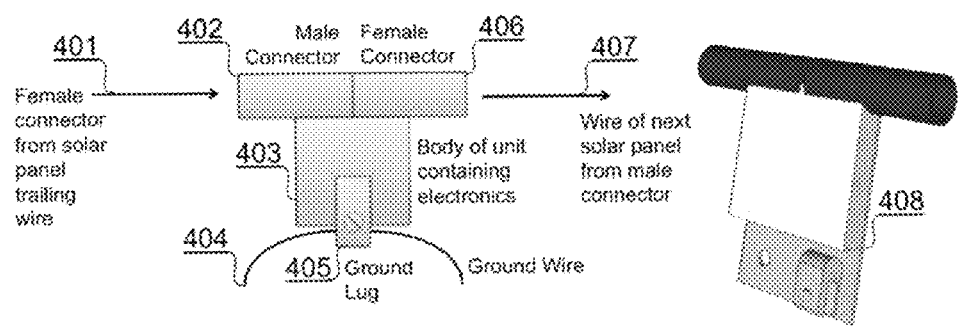
FIG. 4 depicts a possible implementation of a control device in accordance with exemplary embodiments of the presently claimed invention.

The first new device is illustrated in FIG. 3 & FIG. 4. Insertion of the device (306 for example) between panels (302, 303) follows the natural installation flow and requires interruption of one panel connection per device and a connection to ground.

In the case where per-panel operation is not required for cost or other reasons, the device can be deployed to cover panels in groups of 2 or more.

Stringing of panels together is recognized in the solar industry as being the easiest and quickest way of installing them. This invention allows this same method to be used with only a minimum of extra work and connections to be made while enabling extra functionality to groups or individual panels.

For such a device to function it requires two key aspects to be implemented: power to be provided to the device for on-board electronics, and communication to allow control and reporting back of results.

Power, Instance #1

In order to power such a remote device, a method is to inject AC onto the string of panels. Suitable apparatus at the termination device might include a common mode choke (506) and other elements as shown in FIG. 5(a). An advantage of such an approach is that the DC power from the panels is not affected by this AC perturbation, but all connection points along the string of solar panels can derive power from the perturbation. AC is added by (507) and coupled onto the power lines by capacitors (509). Modulation may be disabled with the switch (508).

Control of the termination device (501, 501b) is shown in more detail in FIG. 5(b). Voltages on the input of the power conversion block (570b) are measured with voltage transducers (551b, 540b). Outputs of these transducers (561b, 562b) connect to inputs $In_1$ & $In_2$ of the multi-channel ADC (541b). The output of the communication receiver (510b) connects to $In_3$ of the multi-channel ADC (541b). Output of the multi-channel ADC (541b) connects to the micro-processor (542b). $Output_1$ (550b) of the micro-processor (542b) connects to the communications transmitter (507b). The output of the communications transmitter (507b) can be tri-stated using the switch (508b), which is controlled by $Out_2$ (551b) of the micro-processor (542b).

The logical flow communicating with a single remote device is shown in FIG. 5(c). The same logic should be repeated for communicating with multiple devices.

Powering of the remote device can be achieved with circuitry such as shown in FIG. 6(a). All panels will have sufficient voltage difference relative to ground for sufficient time to store energy for the remote device. Storage within the device allows it to operate for periods of time if the AC variation is switched off. AC variation on the panel wires (621, 622) pass through the coupling capacitor (604) to the rectifier (607). The rectifier output is connected to the control unit (610) and also the storage capacitor (612).

Control of the Instance #1 device is illustrated in FIG. 6(b). Voltage measurements are made via the voltage transducer (611b), which is connected to input $In_2$ (660b) of the multi-channel ADC (641b). Communication signals from the remote termination device pass through the receiver (609b), which is connected, to $In_1$ (661b) of the multi-channel ADC (641b). The multi-channel ADC converts analog signals to digital signals that are sent as inputs to the microprocessor (642b). Output $Out_1$ (650b) of the microprocessor feeds the transmitter (606b). The transmitter output can be tri-stated by the switch (605b), which is controlled by $Out_2$ (651b) of the microprocessor. For implementations of device Instance #1 that incorporate fire safety shutdown such as FIG. 7, relay drivers (652b and 653b) are included, driven by microprocessor (642b) $Out_3$ and $Out_4$. The outputs of the relay drivers (652b and 653b) connect to a latching relay (714 in FIG. 7).

Logical flow of the control unit (610, 610b) is shown in FIG. 6(c).

Communication, Instance #1

Communication may be provided over the panel connection wires back to the termination device, or wirelessly; our preferred implementation uses the former method.

Communication is enabled by injecting AC signals onto the energy-carrying wires capacitively or inductively. Using the device power scheme described above it is possible to turn off the AC and have the remote devices be self-powered for short periods if desired. During this time remote devices communicate to the termination device. Alternatively turning off AC off is not required.

Figure 5:
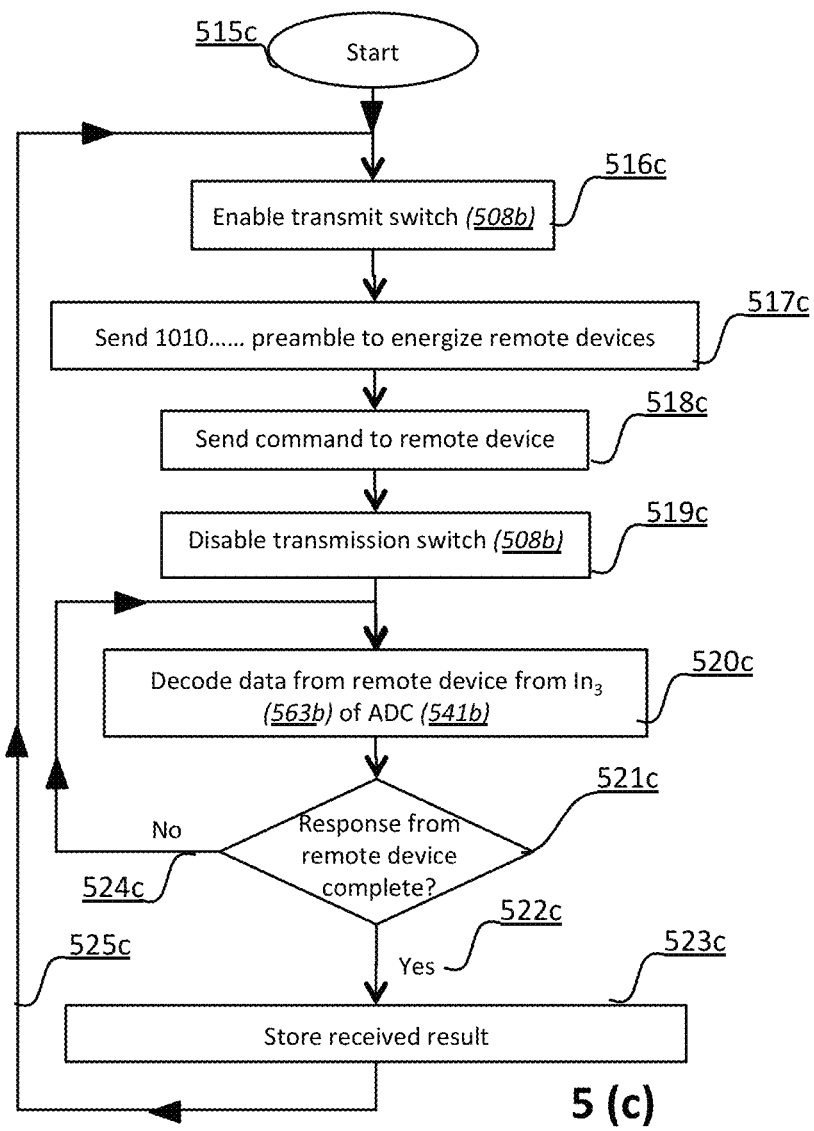
FIG. 5(a) depicts circuitry for superimposing an AC perturbation onto a string of panels in accordance with exemplary embodiments of the presently claimed invention.
FIG. 5(b) depicts control circuitry in accordance with exemplary embodiments of the presently claimed invention.
FIG. 5(c) depicts a logical flow for communication with a remote device in accordance with exemplary embodiments of the presently claimed invention.

For the termination device (501) shown in FIG. 5, communication may be added by modulating the AC variation using the transmitter (507) and coupled to the panel cables either capacitively as shown (509) or inductively (not shown). Communication in the return direction is accomplished with the receiver (510).

Figure 6:
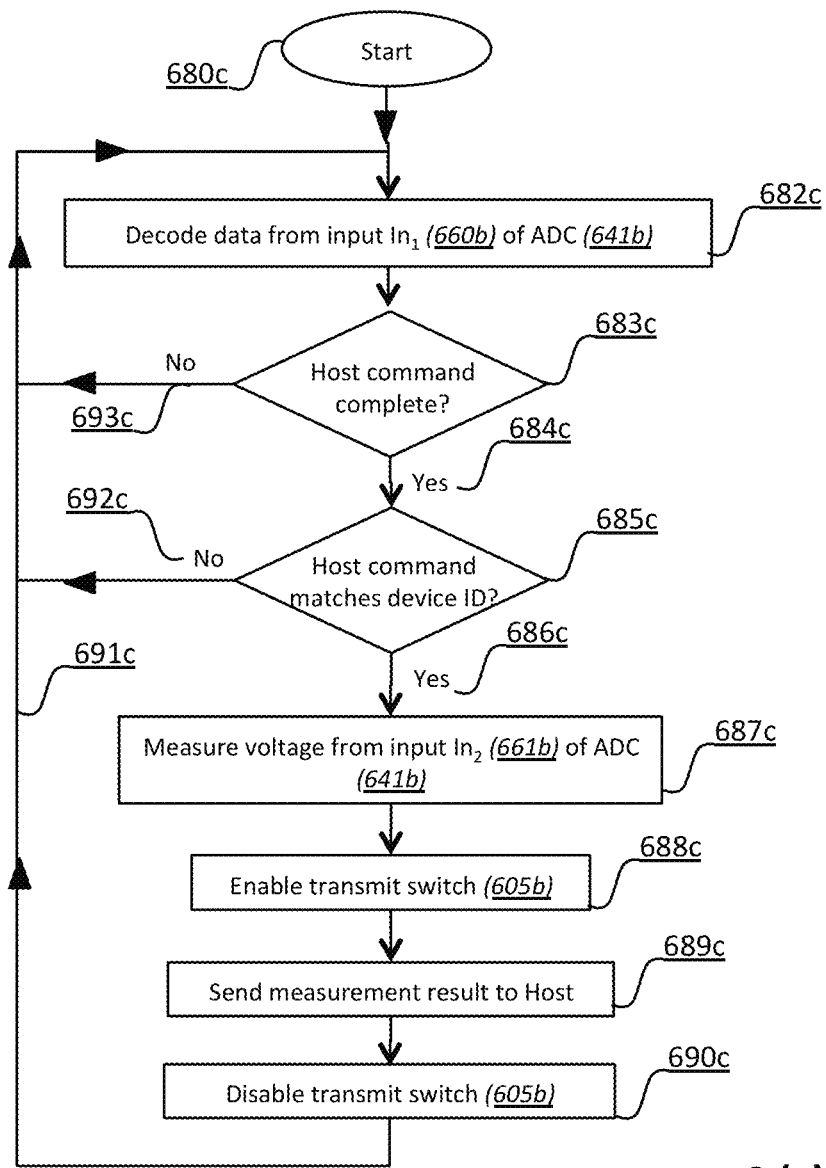
FIG. 6(a) depicts measurement circuitry in accordance with exemplary embodiments of the presently claimed invention.
FIG. 6(b) depicts circuitry implementing the control unit of FIG. 6(a) in accordance with exemplary embodiments of the presently claimed invention.
FIG. 6(c) depicts a logical flow (c) for operation of the circuitry of FIG. 6(a) in accordance with exemplary embodiments of the presently claimed invention.

The remote Instance #1 device preferred implementation shown in FIG. 6 couples communication signals onto the panel cables capacitively (608) and has a transmitter (606) capable of disconnection (605) and a receiver (609).
Mixed-Mode Identification When commissioning new solar systems with remote devices there is often a labor intensive phase where an installer has to manually note down serial numbers of remote devices and record their location in the string. The scheme described here has significant advantage by performing this automatically using a novel mixed-mode approach. The stages of discovery are: first, the system is powered up, and a digital communication protocol is used to request and receive the serial numbers of all remote devices connected on a given string (this does not, however, indicate their order in the string); and, second, make analog voltage measurements at each remote device (correlation of the serial numbers with the voltage measured is used to deduce the connection order of remote devices).

Following commissioning, the system performs regular polling of devices to receive measurement data. The preferred implementation takes the device information established during discovery and assigns a specific individual delay time to each remote device. The controller sends a broadcast signal to the remote devices to make a measurement and report; each device then reports its result after its own assigned delay, therefore the controller receives one result after another in sequence and knows where each came from. This is time and power-efficient. Instance #1 has several possible functions including:

- Measurement of power generation of an individual panel or group of panels. The current is the same through all panels in a string, so current may either be measured in the Instance #1 device, or at the termination device. Voltage is measured in each Instance #1 device for the panel or group of panels it serves.
- Arc detection. When connectors experience faults or corrosion, arcing is possible. Arcing has a voltage noise signature that can be measured with the voltage measurement functionality described above.
- Theft detection. Communication with each Instance #1 device allows detection of a panel becoming disconnected. Detection of at least one more panel being disconnected is also enabled with the preferred implementation described here, and therefore a pattern of disconnection that can be ascribed to theft with a high degree of certainty. (Further discussion of this can be found in U.S. Patent Application 61/781,522, entitled "Reverse Energy Flow In Solar and Other Power Generation Systems For Theft Detection, Panel Identification and Diagnostic Purposes", which was filed on Mar. 14, 2013, the disclosure of which is incorporated herein by reference.)
- Panel frame temperature measurement. The device with temperature sensor is bolted to the panel frame as part of the grounding scheme in our implementation shown in FIG. 4, and will have the same temperature as the panel.
- Panel location mapping. A button or sensor can provide a means of linking between logical and physical locations, and can provide a link to suitable mapping software.
- MPPT per panel (discussed in more detail below).
- Fire safety shutdown (discussed in more detail below).

Fire Safety Shutdown

Figure 7:
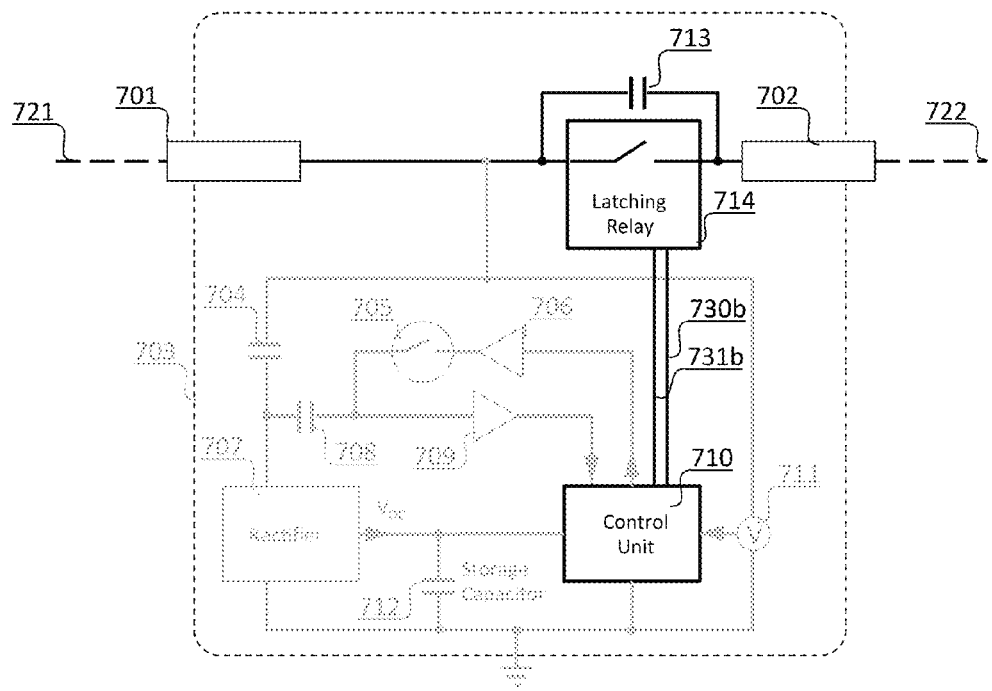
FIG. 7 depicts circuitry for implementing fire safety shutdown in accordance with exemplary embodiments of the presently claimed invention.

It is often desirable, or indeed mandated, that individual panels be disconnected from the string in order to keep the overall voltages present low enough not to endanger human life. A novel method of providing fire safety shutdown is described by us elsewhere (see U.S. Patent Application 61/781,544, entitled "Novel Implementation of Fire Safety Shutdown for Solar Panels with High Reliability", which was filed on Mar. 14, 2013, the disclosure of which is incorporated herein by reference) and may be implemented as part of device Instance #1 as shown in FIG. 7.

There are at least two ways to safely remove hazardous voltages from an array: break the string by disconnecting panels, and short panels to ground. in a preferred implementation the first approach is used.

Figure 1:
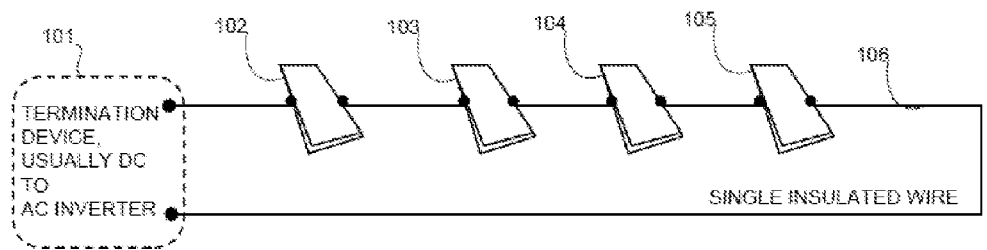
FIG. 1 depicts a common method of connecting solar panels in strings.
Figure 2A:
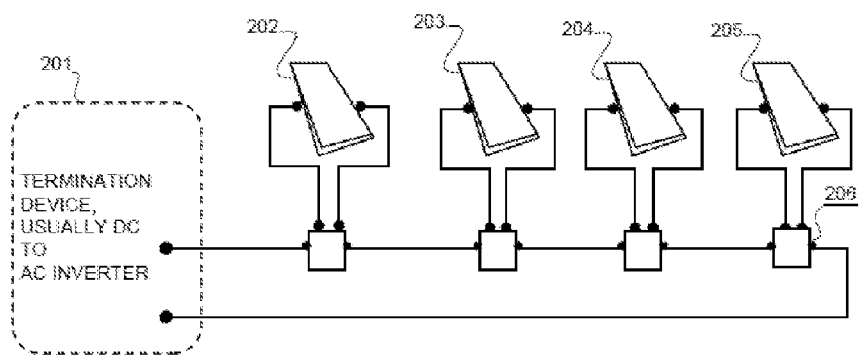
FIG. 2 depicts solar panels connected through measurement and/or control devices.
Figure 2B:
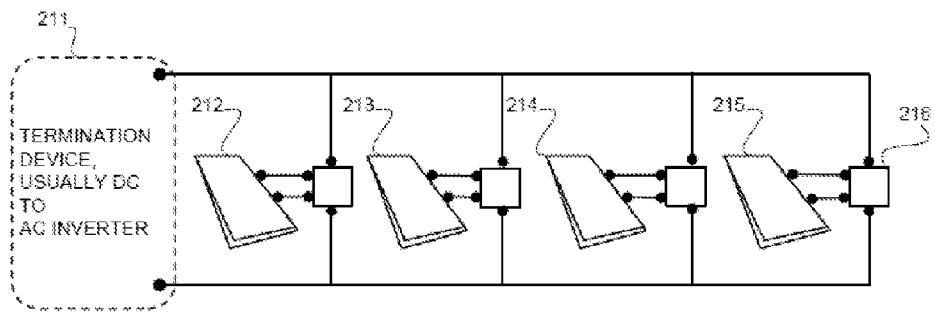
Figure 8:
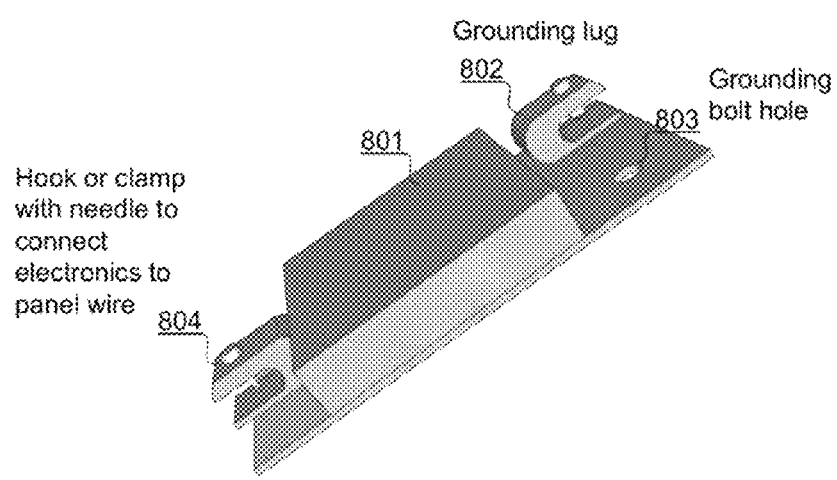
FIG. 8 depicts an alternative implementation of a control device in accordance with exemplary embodiments of the presently claimed invention.

Here the Control Unit (710) is connected (730*b*, 731*b*) to a latching relay (714) that disconnects the cable between panels (701, 702). When the cable connection is broken by the relay AC perturbation energy is still transferred to other devices by the bypass capacitor (713). This capacitor (713) has the additional benefit of suppressing any possible arcing by the latching relay (714) when switching occurs. The implementation of Instance #1 device described in FIG. 4 is one possible approach that reduces installation time. A further refinement (FIG. 8), Instance #1 a, is to eliminate the male and female connector pair of our device that is inserted between panels; instead, the panels are connected to each other as with the simple string of FIG. 1, and the remote device is constructed with a single hook or clamp (804) that may be rested against the wire and then clamped such that a needle penetrates the panel wire without severing it, providing the required connection. An implementation such as FIG. 8 would benefit from being designed to maintain weatherproofing integrity of the panel connections. It also has the advantage of being connector-type agnostic, making it especially beneficial when retrofitting existing installations.

All of the functionality listed in the previous section would be possible in this case. Fire safety shutdown will be implemented by shorting panels to ground using the previously described latching relay; it will require an inductor or transformer in series with the relay to maintain power and communications when shutdown is activated. An additional approach is to design the remote device in FIG. 8 to replace the grounding lug that is usually supplied separately with solar panels and must be attached at the time of installation by the installer; an integrated design would mean the remote device is screwed to the panel (803) and the grounding wire passed through the grounding lug (802) of the remote device (801), providing grounding for the panel and the remote device in a single step. Alternatively a WEEB-compliant washer or similar may be used instead of the grounding lug.
Measurement, Control and Harvest Optimization, Instance #2

Figure 9:
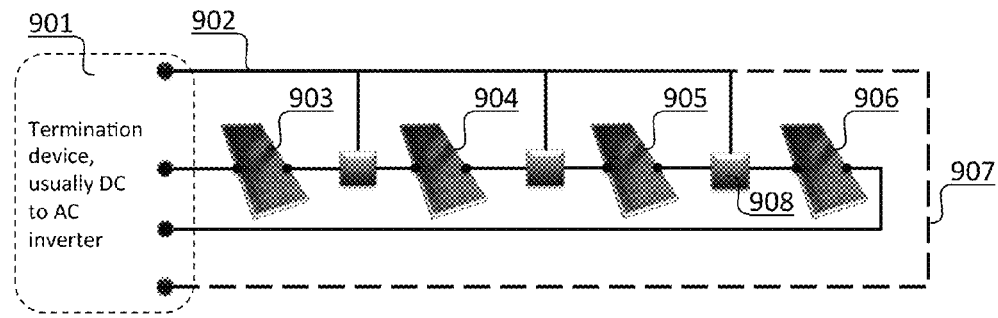
FIG. 9 depicts solar panels connected with a minimum of connections for measurement and control in accordance with alternative exemplary embodiments of the presently claimed invention.

A second implementation (Instance #2) has an extra cable between devices (902) and back to a termination device (901) able to provide communications and control, as shown in FIG. 9. Grounding of each device and an additional return cable (907) are both optional.

Figure 10:
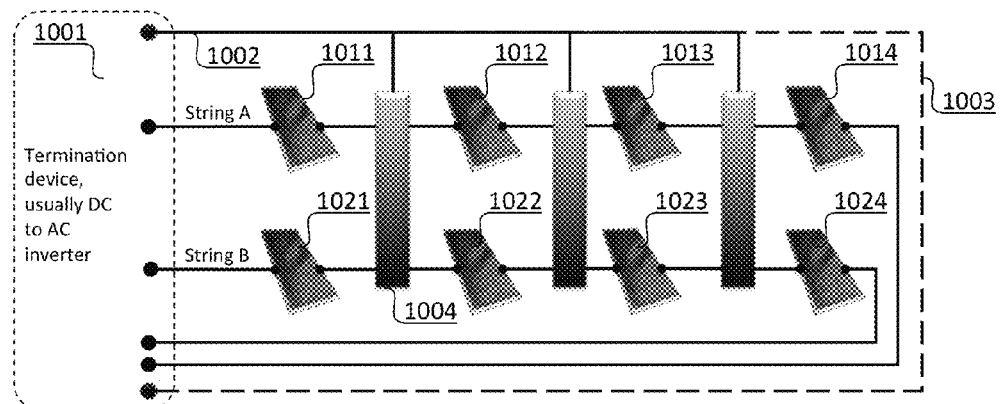
FIG. 10 depicts solar panels connected with a minimum of connections for measurement and control in accordance with further alternative exemplary embodiments of the presently claimed invention.

A further variation of Instance #2 is envisaged, shown in FIG. 10. Here a second string of solar panels is also connected through measurement and control devices (1004); while the layout of panels (1011, 1012, 1013, 1014, 1021, 1022, 1023, 1024) might require more planning to allow such a configuration, it does allow the number of devices to be reduced by half.

With device Instance #2 all of the functions described for Instance #1 are possible.
MPPT Implementation MPPT allows control of the operating point of a single panel or group of panels to achieve the highest possible power harvest under a variety of operating conditions. FIG.

11 shows a preferred implementation of MPPT per panel or group of panels using the Instance #1 device, although other implementations are possible.

Figure 11:
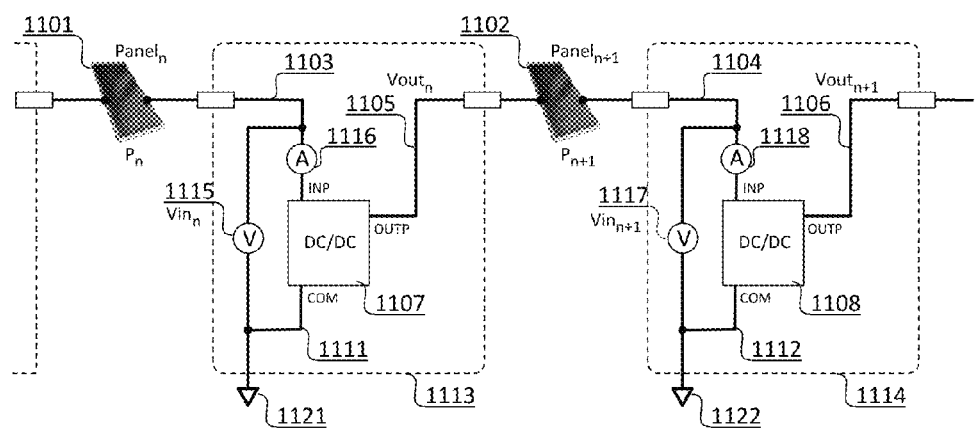
FIG. 11 depicts exemplary circuitry for implementation of MPPT.

For an architecture such as FIG. 9 where the inverter input maintains a fixed voltage, the device described in FIG. 11 will converge to maximum power for each panel in the string. The algorithm outlined in FIG. 13 is included to show the device will work stand alone without external communication or control although more sophisticated algorithms involving communications could be implemented.

With reference to FIG. 11 and FIG. 13: The conversion ratio $K_{DC\text{-}DC}$ (1301) is defined using $Vout_n$ (1302) which is measured relative to ground ((1105) to (1111)), and $Vin_n$ (1300) which is measured relative to the same ground ((1103) to (1111)).

The measurement of $power_n$ (1305) is the multiplication of voltage (1115) and current (1116).

Fire safety shutdown may be implemented using the preferred implementation of FIG. 11 by adding a latching relay that shorts the panel wire (1103) to ground (1121) with suitable control; however, if the DC-DC converter (1107) is implemented as a buck converter, disabling all transistors in the circuitry will cause panel disconnection as an alternative method of achieving safety shutdown through panel isolation. FIG. 12 shows two generic buck converter circuits (a) and (b). Disabling S (1201) in (a) or $S_1$ (1203) and $S_2$ (1205) in (b) will accomplish safety shutdown of the panel (1202, 1204) in each case.

MPPT Implementation, Instance #2

Figure 14:
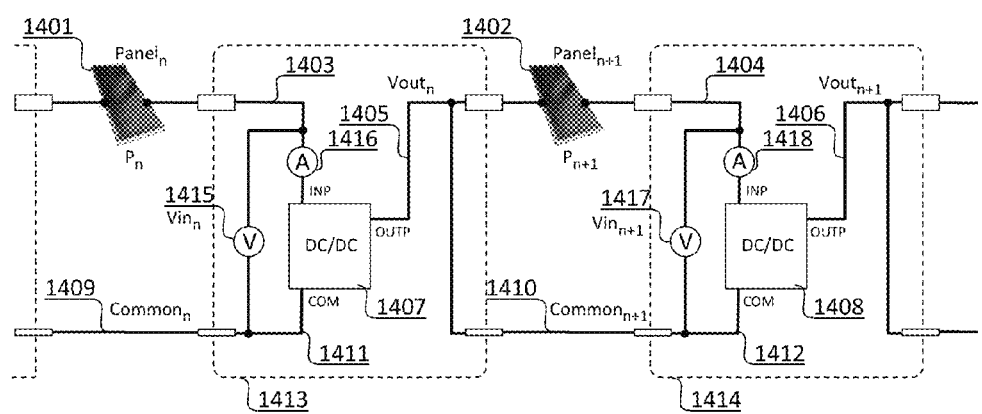
FIG. 14 depicts alternative exemplary circuitry for implementation of MPPT.

FIG. 14 shows a preferred implementation of MPPT per panel or group of panels using the Instance #2 device, although other implementations are possible.

For an architecture such as FIG. 9 where the inverter input maintains a fixed voltage, the device described in FIG. 14 will converge to maximum power for each panel in the string. The algorithm outlined in FIG. 13 is included to show the device will work stand alone without external communication or control although more sophisticated algorithms involving communications could be implemented.

With reference to FIG. 13 and FIG. 14: The conversion ratio of the DC-DC converter, $K_{DC\text{-}DC}$ (1301), is defined using $Vout_n$ (1302) which is measured relative to $Common_n$ ((1405) to (1411)), and $Vin_n$ (1300) which is measured relative to the same $Common_n$ ((1403) to (1411)).

The measurement of $power_n$ (1305) is the multiplication of voltage (1415) and current (1416).

Fire safety shutdown may be implemented using the preferred implementation of FIG. 14 by adding a latching relay that shorts the panel wire (1403) to Common (1411); however, if the DC-DC converter (1407) is implemented as a buck converter, disabling all transistors in the circuitry will cause panel disconnection as an alternative method of achieving safety shutdown through panel isolation.

MPPT Algorithms

Panel performance is usually assessed through measurements of voltage and current and usually has a characteristic shape. Under certain conditions such as shading this shape can deviate significantly, and exhibit more than one maxima; in such conditions it is important for the controlling device to be able to identify the point that yields the most power delivery and not be fooled by other localized maxima. This practical situation is accommodated with a more sophisticated algorithm than described in FIG. 13 but may be realized with the same hardware as detailed in FIG. 11 and FIG. 14.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a system for enabling communications via a power line conveying DC power from multiple DC power sources, comprising:
    first and second power line electrodes for connecting to first and second ends of a power line conveying DC power from a plurality of serially coupled DC power sources;
    receiver circuitry coupled to said first and second power line electrodes, and responsive to one or more power line voltages at said first and second power line electrodes by providing first and second signals related to said one or more power line voltages;
    transceiver circuitry coupled to said first and second power line electrodes and said receiver circuitry, responsive to one or more power line signals by providing a third signal related to said one or more power line signals, and responsive to a fourth signal and at least one control signal by conveying said fourth signal to said first and second power line electrodes; and
    control circuitry coupled to said receiver circuitry and said transceiver circuitry, and responsive to at least said first, second and third signals by providing said fourth signal and said at least one control signal, wherein said control circuitry comprises:
        analog-to-digital conversion circuitry responsive to said first, second and third signals by providing one or more digital signals; and
        processing circuitry coupled to said analog-to-digital conversion circuitry and responsive to at least said one or more digital signals by providing said fourth signal and said at least one control signal.

2. The apparatus of claim 1, wherein said one or more power line signals comprises a common mode signal.

3. The apparatus of claim 1, wherein said receiver circuitry comprises:
    a common mode choke including said first and second power line electrodes and first and second termination electrodes, and responsive to said one or more power line voltages by providing first and second termination voltages; and
    voltage transducer circuitry coupled to said first and second termination electrodes and responsive to said first and second termination voltages by providing said first and second signals.

4. The apparatus of claim 1, wherein said transceiver circuitry comprises:
    signal coupling circuitry coupled to said first and second power line electrodes;
    incoming amplifier circuitry coupled between said signal coupling circuitry and said control circuitry; and
    outgoing amplifier circuitry coupled between said control circuitry and said signal coupling circuitry.

5. The apparatus of claim 4, further comprising switching circuitry coupled between said outgoing amplifier circuitry and said signal coupling circuitry, and responsive to said at least one control signal by providing low and high impedance signal paths between said outgoing amplifier circuitry and said signal coupling circuitry during first and second mutually exclusive time intervals.

6. An apparatus including a system for enabling communications via a power line conveying DC power from multiple DC power sources, comprising:
  a power line electrode for connecting to a power line conveying DC power from a plurality of serially coupled DC power sources and an AC signal;
  a reference electrode;
  local power circuitry coupled between said power line and reference electrodes, and responsive to at least a first portion of said AC signal by providing a local DC power; and
  transceiver circuitry coupled between said power line and reference electrodes and to said local power circuitry, and responsive to said local DC power and said at least a first portion of said AC signal by providing a second portion of said AC signal.

7. The apparatus of claim 6, wherein said transceiver circuitry comprises:
  signal coupling circuitry coupled to said power line electrode;
  control circuitry coupled between said power line and reference electrodes;
  incoming amplifier circuitry coupled between said signal coupling circuitry and said control circuitry, and responsive to said at least a first portion of said AC signal by providing an incoming signal; and
  outgoing amplifier circuitry coupled between said control circuitry and said signal coupling circuitry, and responsive to an outgoing signal by providing said second portion of said AC signal.

8. The apparatus of claim 7, wherein said control circuitry comprises:
  voltage transducer circuitry coupled between said power line and reference electrodes, and responsive to a power line voltage at said power line electrode by providing a voltage signal;
  analog-to-digital conversion circuitry responsive to said incoming signal and said voltage signal by providing one or more digital signals; and
  processing circuitry coupled between said analog-to-digital conversion circuitry and said outgoing amplifier circuitry, and responsive to at least said one or more digital signals by providing said outgoing signal and at least one control signal.

9. The apparatus of claim 8, further comprising switching circuitry coupled between said outgoing amplifier circuitry and said signal coupling circuitry, and responsive to said at least one control signal by providing low and high impedance signal paths between said outgoing amplifier circuitry and said signal coupling circuitry during first and second mutually exclusive time intervals.

10. A method for enabling communications via a power line conveying DC power from multiple DC power sources, comprising:
  connecting a power line electrode to a power line conveying DC power from a plurality of serially coupled DC power sources and an AC signal;
  responding to at least a first portion of said AC signal by providing a local DC power; and
  responding to said local DC power and said at least a first portion of said AC signal by providing a second portion of said AC signal.

11. The method of claim 10, wherein said responding to said local DC power and said at least a first portion of said AC signal by providing a second portion of said AC signal comprises:
  responding to said at least a first portion of said AC signal by providing an incoming signal; and
  responding to an outgoing signal by providing said second portion of said AC signal.

12. The method of claim 11, further comprising:
  responding to a power line voltage at said power line electrode by providing a voltage signal;
  responding to said incoming signal and said voltage signal by providing one or more digital signals; and
  processing at least said one or more digital signals by providing said outgoing signal and at least one control signal.

13. The method of claim 12, further comprising responding to said outgoing signal and at least one control signal by providing said second portion of said AC signal.

* * * * *